(12) United States Patent
Sugimoto et al.

(10) Patent No.: US 9,388,330 B2
(45) Date of Patent: Jul. 12, 2016

(54) BAG CONTAINING BLASTING MATERIAL

(71) Applicants: FUJI ENGINEERING CO., LTD., Osaka (JP); FUJIGIKEN CO., LTD., Osaka (JP); WEST NIPPON EXPRESSWAY COMPANY LIMITED, Osaka (JP)

(72) Inventors: Masanobu Sugimoto, Osaka (JP); Kenichi Yamada, Fukuoka (JP); Toshihiro Hara, Osaka (JP); Masanobu Irie, Fukuoka (JP)

(73) Assignees: FUJI ENGINEERING CO., LTD., Osaka (JP); FUJIGIKEN CO., LTD., Osaka (JP); WEST NIPPON EXPRESSWAT COMPANY, LIMITED, Osaka (JP)

( * ) Notice: Subject to any disclaimer, the term of this patent is extended or adjusted under 35 U.S.C. 154(b) by 390 days.

(21) Appl. No.: 13/716,791

(22) Filed: Dec. 17, 2012

(65) Prior Publication Data
US 2014/0170937 A1     Jun. 19, 2014

(51) Int. Cl.
| C09K 3/14 | (2006.01) |
| B24C 7/00 | (2006.01) |
| B24C 11/00 | (2006.01) |
| C09G 1/02 | (2006.01) |

(52) U.S. Cl.
CPC ............. *C09K 3/1463* (2013.01); *B24C 7/0038* (2013.01); *B24C 11/005* (2013.01); *C09G 1/02* (2013.01)

(58) Field of Classification Search
CPC .. C09K 3/1463; B24C 7/0007; B24C 11/005; C09G 1/02

USPC ..................... 51/307, 308, 309, 293; 451/330
See application file for complete search history.

(56) References Cited

U.S. PATENT DOCUMENTS

| 2,389,616 | A | * | 11/1945 | Franklin | ............... B24C 7/0046 137/268 |
| 2,912,803 | A | * | 11/1959 | Simjian | ................... B24B 31/00 366/220 |
| 3,071,456 | A | * | 1/1963 | Cheesman | .............. B24B 31/14 451/35 |
| 6,194,317 | B1 | * | 2/2001 | Kaisaki et al. | ................. 438/692 |
| 6,238,592 | B1 | * | 5/2001 | Hardy et al. | .................. 252/79.1 |
| 8,277,277 | B2 | | 10/2012 | Mase et al. | |
| 8,408,969 | B2 | | 4/2013 | Mase | |
| 2004/0187393 | A1 | * | 9/2004 | Mutoh et al. | ..................... 51/309 |

(Continued)

FOREIGN PATENT DOCUMENTS

| CN | 1070860 | 4/1993 |
| CN | 2185654 | 12/1994 |

(Continued)

OTHER PUBLICATIONS

Partial English translation of Japanese Office Action (OA) issued Nov. 19, 2013 in corresponding Japanese Patent Application No. P2010-276143.

(Continued)

*Primary Examiner* — Timothy V Eley
(74) *Attorney, Agent, or Firm* — Wenderoth, Lind & Ponack, L.L.P.

(57) ABSTRACT

The blasting material includes abrasives, and water in the range of 5 to 30 mass % both inclusive relative to a mass of the abrasives, the abrasives being prepared in advance such that all of the abrasives are uniformly wet.

13 Claims, 3 Drawing Sheets

(56) References Cited

U.S. PATENT DOCUMENTS

| | | |
|---|---|---|
| 2005/0215060 A1* | 9/2005 | Oh et al. .................. 438/692 |
| 2006/0124026 A1* | 6/2006 | Kollodge ...................... 106/3 |
| 2007/0178811 A1 | 8/2007 | Sundaram et al. |
| 2008/0026583 A1* | 1/2008 | Hardy et al. ................ 438/693 |
| 2009/0011682 A1 | 1/2009 | Mase |
| 2009/0068930 A1 | 3/2009 | Miyasaka |
| 2009/0130959 A1 | 5/2009 | Mase et al. |
| 2010/0087065 A1* | 4/2010 | Boggs et al. ................ 438/692 |
| 2012/0175427 A1* | 7/2012 | Feldman ............... A01G 15/00 239/2.1 |
| 2012/0231704 A1 | 9/2012 | Mase |
| 2013/0000214 A1* | 1/2013 | Chu et al. .................... 51/308 |
| 2013/0288945 A1 | 10/2013 | Miyasaka |

FOREIGN PATENT DOCUMENTS

| | | |
|---|---|---|
| JP | 2880498 | 1/1999 |
| JP | 2001-181815 | 7/2001 |
| JP | 2008-23672 | 2/2008 |
| JP | 2009-766 | 1/2009 |
| JP | 2009-525172 | 7/2009 |
| TW | 200914203 | 4/2009 |
| TW | 200932429 | 8/2009 |

OTHER PUBLICATIONS

Chinese Office Action dated Jul. 15, 2015 issued in counterpart Chinese Patent Application No. 201110406833.4 (with English Translation).

Chinese Office Action dated Feb. 25, 2015 issued in counterpart Chinese Patent Application No. 2011104068334. (with English translation).

Taiwanese Office Action dated Apr. 1, 2016 issued in counterpart Taiwanese Patent Application No. 100145037. (with English translation).

* cited by examiner

BAG CONTAINING BLASTING MATERIAL

BACKGROUND OF THE INVENTION

1. Field of the Invention

The present invention relates to a blasting material to be used in a blasting process carried out for removing a paint and so on from a surface of a target metal before forming a sprayed coating thereon for the purpose of preventing the target metal from being rusted. The present invention further relates to a blasting process in which the above-mentioned blasting material is used.

2. Description of the Related Art

As one of blasting processes in which abrasives such as sand are sprayed by compressed air onto a paint coating for removing the paint coating, there is generally used a dry-type blasting process in which abrasives in dry condition are employed. In a dry-type blasting process, dust is generated because abrasives come into collision with a target and the target is crushed, and further, dust is also generated of removed paint coating and metal oxide such as rust having been generated on a surface of steel on which the paint coating was coated. In particular, when a building in a town and/or a bridge over a river are to be repainted, much costs are necessary for a countermeasure to such dust.

Consequently, many attempts have been made in a dry-type blasting process for preventing dust from generating and dispersing. In a dry-type blasting process, since dust is broadly dispersed, it is difficult to carry out the blasting process in open space. Thus, for instance, Japanese Patent No. 2880498 has suggested a blasting apparatus which is designed to have a function of spraying water, if necessary, at a spray nozzle through which abrasives are sprayed, and hence, is capable of carrying out a wet-type blasting process.

The article "Wet-particle blasting" (retrieved on Nov. 22, 2010 at the site of SNM Asia Corporation (URL: http://snmasia.jp/blaster/blaster01.html)) has suggested wet-particle blasting in which abrasives filled in a tank are compressed by hydraulic pressure, the abrasives are dispensed by a predetermined amount with water existing only between the abrasives, and the abrasives are sprayed together with blast air. In the suggested wet-particle blasting, at a moment when the wet abrasives come into collision with a target, hydraulic films are released like a parachute to thereby prevent generation of dust.

In a process like the above-mentioned Japanese Patent where water films are formed when dry abrasives are sprayed onto a target to thereby prevent generation of dust, it is necessary to spray much water for reducing an amount of dust, because water captures dust for preventing dust from dispersing. In addition, since much waste water is generated, a water treatment equipment is inevitably necessary for cleaning such waste water.

The blasting apparatus suggested in the above-mentioned Japanese Patent is designed to include a tank in which dry abrasives are stored, a main body having a dispenser for dispensing the abrasives in a predetermined amount, a tank storing therein water to be sprayed, a water pump for pressurizing and feeding water, a nozzle through which the abrasives are sprayed together with water, and hoses for connecting the tanks, the water pump, and the nozzle to one another. The blasting apparatus is inevitably large-sized.

Furthermore, through water is mixed into the nozzle in the suggested blasting apparatus, water may be mixed to the abrasives while the abrasives and air are fed together in such a condition that they are mixed with each other. However, a volume of air is remarkably greater than a volume of water and the abrasives in the suggested blasting apparatus. Thus, in actual, air, water and the abrasives are merely mixed in separate condition, and accordingly, each particle of the abrasives cannot be sufficiently wet.

In addition, in the blasting apparatus suggested in the above-mentioned Japanese Patent, since it is difficult to set the large-sized apparatus at its entirety on a scaffold when the apparatus is used in an actual construction site, the apparatus has to be set on the ground in the vicinity of a target to which a blasting process is to be carried out. Thus, a hose through which a spray nozzle and a tank is connected to each other is inevitably lengthy, resulting in deterioration in the performance and an air compressor for supplying compressed air, which makes the blasting apparatus to be larger in size.

In the process suggested in the above-identified article "Wet-particle blasting", the abrasives are merely made wet by forcing out the abrasives by means of hydraulic pressure. Thus, it is not possible to control a volume of water, and a volume of water is not uniform, and hence, an excessive volume of water actually tends to be sprayed.

In particular, when a blasting newly starts, there is a problem that a blasting cannot be started until pressurized water sufficiently penetrates spaces formed between the abrasives.

SUMMARY OF THE INVENTION

In view of the above-mentioned problems in the prior art, it is an object of the present invention to provide a blasting material which is capable of reducing an amount of paint coating removed while blasted and an amount of dust of abrasives, making it no longer necessary to prepare a large-sized blasting apparatus and to carry out water treatment to waste water resulted from a blasting.

It is further an object of the present invention to provide a blasting process in which the above-mentioned blasting material is employed.

In one aspect of the present invention, there is provided a blasting material including abrasives, and water in the range of 5 to 30 mass % both inclusive relative to a mass of the abrasives, the abrasives being prepared in advance such that all of the abrasives are uniformly wet.

Similarly to the dry-type blast, the blasting material in accordance with the present invention is stored in a storage tank of a blasting apparatus, and is sprayed onto a target by means of compressed air. The blasting material is able to capture dust by virtue of water held therein to thereby prevent dust from scattering. Furthermore, since the blasting material in accordance with the present invention contains water in a volume necessary for preventing dust from scattering, waste water is not generated in an excessive volume while a blasting process is being carried out and/or after a blasting process has been finished. In addition, since it is possible to provide the blasting material in a bag, for instance, after mixture of the blasting material with water is accomplished, it is no longer necessary to prepare a tank for storing water therein.

If the blasting material included water below 5 mass % relative to a mass of the abrasives, water would be in short, and hence, it would be difficult to prevent dust from scattering. As an alternative, if the blasting material included water over 30 mass % relative to a mass of the abrasives, water would be separated from the abrasives, resulting in that waste water is generated in an excessive volume while a blasting process is being carried out and/or after a blasting process has been finished.

It is preferable that the blasting material in accordance with the present invention further includes a surfactant (interfacial active agent).

Since the blasting material in accordance with the present invention contains water therein, the blasting material tends to be readily cured when fed out of a tank, resulting in deterioration in fluidity of the blasting material. Thus, by designing the blasting material in accordance with the present invention to include surfactant, it is possible to improve fluidity of the blasting material, and hence, it is possible to stably feed out the blasting material.

It is preferable that the blasting material in accordance with the present invention further includes a water retention agent.

For the purpose of removing a paint, it is effective for the abrasives to have, while a blasting process is being carried out and/or after a blasting process has finished, a small diameter (for instance, a diameter in the range of 0.1 to 0.15 mm both inclusive), in which case, a volume of water held in the abrasives is increased (about 20 mass % at maximum). However, since it is preferable that the abrasives hold water in the range of 15 to 30 mass % both inclusive for removing a paint, the blasting material preferably includes a water retention agent.

In order to smooth a surface of a target onto which a paint is sprayed, it is preferable for the abrasives to have a relatively large diameter (for instance, a diameter in the range of 0.6 to 0.85 mm both inclusive), in which case, a volume of water held in the abrasives is reduced (about 15 mass % at maximum). However, since it is preferable that the abrasives hold water in the range of 5 to 20 mass % both inclusive for smoothing a surface of a target, the blasting material preferably includes a water retention agent.

By designing the blasting material in accordance with the present invention to include the water retention agent, it is possible to increase a volume of water held by the abrasives, and allow the abrasives to uniformly hold water.

It is preferable that the blasting material in accordance with the present invention further includes a rust inhibitor.

By designing the blasting material in accordance with the present invention to include the rust inhibitor, it is possible to lengthen an interval between a blasting process and painting or spraying.

It is preferable that the abrasives have a diameter in the range of 0.1 to 0.15 mm both inclusive, and the blasting material includes the water in the range of 15 to 30 mass % both inclusive.

It is preferable that the abrasives have a diameter in the range of 0.6 to 0.85 mm both inclusive, and the blasting material includes the water in the range of 5 to 20 mass % both inclusive.

It is preferable that the blasting material includes the surfactant in the range of 0.1 to 5 mass % relative to a mass of the water.

It is preferable that the blasting material includes the water and the surfactant in the range of 5 to 30 mass % both inclusive relative to a mass of the abrasives.

It is preferable that the blasting material includes the water and the water retention agent in the range of 5 to 30 mass % both inclusive relative to a mass of the abrasives.

It is preferable that the blasting material includes the water and the rust inhibitor in the range of 5 to 30 mass % both inclusive relative to a mass of the abrasives.

For instance, the abrasives may be composed of alumina, garnet or slag.

In another aspect of the present invention, there is provided a blasting process including preparing a blasting material including abrasives, and water in the range of 5 to 30 mass % both inclusive relative to a mass of the abrasives, the abrasives being prepared in advance such that all of the abrasives are uniformly wet, putting the blasting material into a tank, and spraying the blasting material onto a target by means of compressed air.

In still another aspect of the present invention, there is provided a bag composed of a material capable of preventing water stored therein from evaporating, the bag containing the above-mentioned blasting material.

It is preferable that the blasting material contained in the bag further includes a surfactant, water retention agent, and/or rust inhibitor.

The advantages obtained by the aforementioned present invention will be described hereinbelow.

Firstly, the blasting material in accordance with the present invention includes water in the range of 5 to 30 mass % both inclusive relative to a mass of the abrasives, which are prepared in advance such that all of the abrasives are uniformly wet. By spraying the blasting material onto a target, it is possible to capture dust by virtue of water held in the blasting material, and prevent dust from scattering. Furthermore, since waste water is not generated in an excessive volume while a blasting process is being carried out and/or after a blasting process has been finished, it is no longer necessary to carry out water treatment other than the treatment to the abrasives after a blasting process was finished. In addition, since it is possible to provide the blasting material in a bag, for instance, it is no longer necessary to prepare a tank for storing water therein. Furthermore, it is possible to assemble a blasting apparatus in a smaller size than a conventional blasting apparatus, and hence, it is now possible to set a blasting apparatus at entirety thereof on a scaffold in a construction site. In addition, since a hose through which a nozzle for spraying the blasting material therethrough is connected to a tank in which the blasting material is stored can be designed to have a minimum length, it is possible to reduce deterioration in performance, and it is further possible to drive a blasting apparatus by means of a small-sized air compressor.

Secondly, by designing the blasting material to further include a surfactant, it is possible to improve fluidity of the blasting material, and hence, it is further possible to stably feed the blasting material from a tank in which the blasting material is stored.

Thirdly, by designing the blasting material to further include a water retention agent, it is possible to increase a volume of water held in the abrasives, and hence, it is further possible for the abrasives to uniformly hold water therein.

Fourthly, by designing the blasting material to further include a rust inhibitor, it is possible to lengthen an interval between a blasting process and painting or spraying. For instance, when the blasting material is used for smoothing a surface of a target onto which a paint is to be sprayed, both a blasting process and spraying a paint have to be carried out within four hours in accordance with Japanese Industrial Standard (JIS) H8300. By designing the blasting material to further include a rust inhibitor, it is possible to prevent an adhesive force of a sprayed coating from deteriorating in the case that a step of forming a sprayed coating was carried out one or two days later after a blasting process was carried out, ensuring enhancement in workability.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENT

Figure 1:
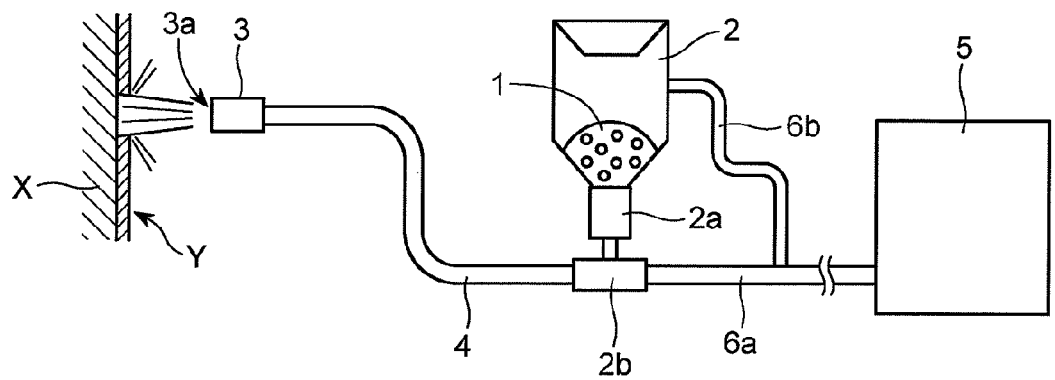
FIG. 1 is a schematic view of a blasting apparatus in which the blasting material in accordance with a preferred embodiment of the present invention is used.

FIG. 1 is a schematic view of a blasting apparatus in which the blasting material in accordance with a preferred embodiment of the present invention is used.

The blasting apparatus illustrated in FIG. 1 includes a tank 2 in which the blasting material 1 in accordance with the preferred embodiment is stored, a nozzle 3 through which the blasting material 1 is sprayed onto a target X, and a hose 4 through which the tank 2 and the nozzle 3 are connected to each other.

An air compressor 5 is connected to the tank 2 and the nozzle 3 for supplying compressed air.

The tank 2 includes a dispensing section 2a in which the blasting material 1 is dispensed, and a mixture section 2b in which the blasting material 1 is mixed with compressed air. The mixture of the blasting material 1 and compressed air is fed to the nozzle 3 through the hose 4. The mixture section 2b and the air compressor 5 are connected to each other through an air hose 6a. The air compressor 5 and an upper portion of the tank 2 are connected to each other through an air hose 6b.

The tank 2 is a pressure type tank in which the blasting material 1 is pressurized by compressed air for feeding the blasting material 1 out of the tank 2. As an alternative, the tank 2 may be designed to be an open type tank in which the blasting material 1 is merely stored in non-pressurized condition.

Since the blasting material 1 in accordance with the preferred embodiment often has smaller fluidity than conventional dry-type abrasives, the dispensing section 2a is designed to be comprised of a feeder such as a table feeder, a screw feeder and a rotary valve feeder. The dispensing section 2a divides the blasting material 1 into a predetermined volume, and feeds the blasting material 1 to the mixture section 2b.

The air compressor 5 may be electrically driven or be driven by means of an engine. Oil and water contained in compressed air supplied from the air compressor 5 pass through a filter (not illustrated), and then, are supplied to the tank 2 and the mixture section 2b through the air hoses 6b and 6a, respectively.

The blasting apparatus further includes operational switches (not illustrated) by which the blasting apparatus is turned on or off, and valves (not illustrated).

The blasting material 1 to be used in the blasting apparatus includes abrasives, and water in the range of 5 to 30 mass % both inclusive relative to a mass of the abrasives. The abrasives are prepared in advance such that all of the abrasives can be uniformly wet. The abrasives may be any non-metal abrasives such as alumina, garnet, silica sand, glass beads, silicon carbide and slag.

The abrasives and water are mixed to each other in advance. Then, the mixture in the range of 10 to 25 kilograms, for instance, is packed into a small bag as a piece of the blasting material 1. The blasting material 1 may be designed to include a commercially available rust inhibitor, surfactant and/or water retention agent other than water.

As a rust inhibitor, a commercially available amine-containing rust inhibitor may be used, for instance. As a surfactant, a commercially available chemical compound containing naphthalene sulfonic acid formalin therein, alkyl benzen sodium sulfonate, polyoxyethylene alkyl ether or polyoxyethylene fatty acid methyl ester may be used, for instance. As a water retention agent, a commercially available polyacrylic acid sodium may be used, for instance.

The blasting material 1 contains water in the range of 5 to 30 mass % in dependence on a material of which the abrasives are composed and/or an average diameter of the abrasives. For instance, in the case that the abrasives are composed of alumina and have a diameter in the range of 0.1 to 0.15 mm, there are prepared bags containing the mixture of the blasting material 1 and water at various mass percents. For instance, there are prepared six bags each containing the mixture of the blasting material 1 and water at 5 mass %, 10 mass %, 15 mass %, 20 mass %, 25 mass % and 30 mass %, respectively. A bag containing the mixture of the blasting material 1 and water therein is designed to prevent water from evaporating in order not to vary a volume of water.

In the case that the blasting material 1 is designed to include a surfactant, the blasting material 1 contains surfactant in the range of 0.1 to 5 mass % relative to a mass of water, for instance. In the case that the abrasives are composed of alumina and have a diameter in the range of 0.1 to 0.15 mm, the blasting material 1 tends to be readily cured when the blasting material 1 is fed to the dispensing section 2a from the tank 2 or when the blasting material 1 is fed to the mixture section 2b from the dispensing section 2a, with the result of deterioration in fluidity of the blasting material 1. By designing the blasting material 1 to include the surfactant, it is possible to improve fluidity of the blasting material 1, ensuring that the blasting material 1 can be fed stably from the tank 2.

The blasting material 1 may preferably contain a water retention agent therein. In the case that the abrasives have a diameter in the range of 0.1 to 0.15 mm, the abrasives can hold water at about 20 mass %, and in the case that the abrasives have a diameter in the range of 0.6 to 0.85 mm, the abrasives can hold water at about 15 mass %. Accordingly, the abrasives cannot hold water beyond those mass %, and excessive water is separated from the abrasives. Thus, by designing the blasting material 1 to include the water retention agent, it is possible for the abrasives to hold water at an increased mass %, ensuring that the abrasives can uniformly hold water therein.

In the case that the blasting material 1 contains a rust inhibitor, surfactant and water retention agent as well as water, it is preferable that the blasting material 1 contains rust inhibitor, surfactant, water retention agent and water totally in the range of 5 to 30 mass % relative to a mass of the abrasives. By designing the total mass % in the above-identified range, even if the blasting material 1 contains the rust inhibitor, surfactant and/or water retention agent, the blasting material 1 contains the abrasives at a fixed mass %, ensuring that it is possible to maintain a desired blasting performance.

In the operation of the blasting apparatus, the blasting material 1 having been prepared in advance is put into the tank 2 by a necessary volume. Starting the blasting apparatus, compressed air is supplied to the tank 2 and the mixture section 2b from the air compressor 5, fed to the nozzle 3 through the hose 4, and sprayed out of the nozzle 3. The blasting material 1 is dispensed by a predetermined volume in the dispensing section 2a, and fed to the mixture section 2b. The blasting material 1 is stirred in the mixture section 2b by compressed air, fed through the hose 4 together with compressed air, and sprayed through an opening 3a of the nozzle 3.

The blasting material 1 comes into collision with a surface of the target X, peels off adhesives Y such as paint coating, rust, and/or contamination, scatters around the target X, and accumulates around the target X. Since the blasting material 1 in accordance with the current embodiment includes the abrasives covered at a surface thereof with water film, water held in the abrasives is first sprayed onto a surface of the adhesives Y when the blasting material 1 is sprayed through the nozzle 3 and comes into collision with a surface of the target X, and then, the adhesives Y are peeled off and/or crushed by means of the abrasives. Thus, it is possible to effectively wet powder of the adhesives Y generated when the adhesives Y are peeled off or crushed, resulting in reduction a volume of powder.

In the current embodiment, it is possible to use the blasting material 1 in a bag in which water is also stored at a volume in the range of 5 to 30 mass % relative to a mass of the abrasives. Accordingly, a volume of water can be selected in accordance with condition of the target X in order to reduce an amount of dust.

Furthermore, even if a volume of the blasting material 1 to be sprayed were not kept stable and hence were fluctuated, there does not occur a case that only water is sprayed. Since water is sprayed at a volume fixed relative to a volume of the sprayed blasting material 1, water is not excessively scattered, and it is possible to prevent the generation of an excessive amount of dust caused by a shortage of water.

As mentioned above, by spraying the blasting material 1 onto the target X, similarly to the conventional dry-type blasting, it is possible to capture dust by virtue of water held in the blasting material 1, and prevent dust from scattering. Furthermore, since waste water is not generated in an excessive volume while a blasting process is being carried out and/or after a blasting process has been finished, it is no longer necessary to carry out water treatment other than the treatment to the abrasives after a blasting process was finished.

Figure 2A:
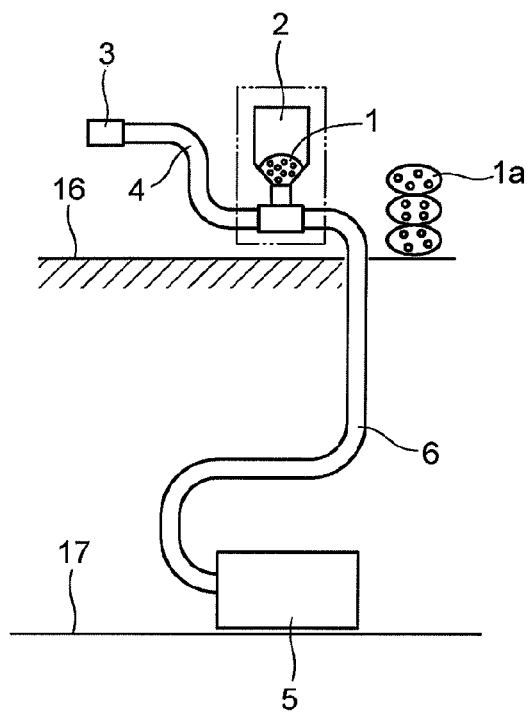
FIG. 2A is a view of the blasting apparatus in which the blasting material in accordance with a preferred embodiment of the present invention is used.

Hereinbelow is explained, with reference to FIGS. 2A and 2B, the difference between the blasting apparatus in which the blasting material 1 in accordance with the current embodiment is used, and the conventional blasting apparatus. FIG. 2A is a view of the blasting apparatus in which the blasting material 1 in accordance with the current embodiment is used, and FIG. 2B is a view of the conventional blasting apparatus.

As illustrated in FIG. 2A, in the blasting apparatus in which the blasting material 1 in accordance with the current embodiment is used, the tank 2 is set on a scaffold 16, which is connected to the air compressor 5 set on the ground 17, through an air hose 6.

Figure 2B:
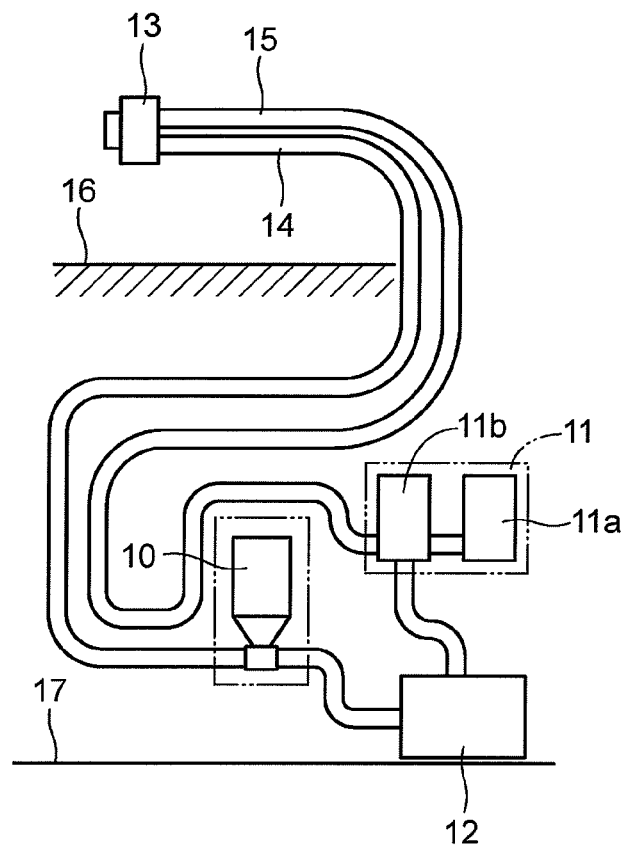
FIG. 2B is a view of a conventional blasting apparatus.

In contrast, in the conventional blasting apparatus, as illustrated in FIG. 2B, a tank 10 in which blasting materials are stored, a water supply unit 11 including a tank 11a in which water is stored, and a water pump 11b, and an air compressor 12 are set on the ground 17, and a nozzle 13 set on a scaffold 16 is connected to the tank 10 and the water supply unit 11 through hoses 14 and 15, respectively.

As illustrated in FIG. 2A, in the blasting apparatus in which the blasting material 1 in accordance with the current embodiment is used, since the blasting material 1 including abrasives, and water in the range of 5 to 30 mass % both inclusive relative to a mass of the abrasives, the abrasives being prepared in advance such that all of the abrasives can be uniformly wet, can be provided in a bag 1a, it is no longer necessary for the blasting apparatus to include the tank 11a, the water pump 11b and the water hose 15 all of which were necessary to be included in the conventional blasting apparatus. Accordingly, the blasting apparatus in which the blasting material 1 in accordance with the current embodiment is used can be down-sized, and further, can be set at entirety thereof on the scaffold 16 in a construction site.

Thus, the hose 4 through which the nozzle 3 and the tank 2 are connected to each other can be designed to have a minimum length, ensuring it to prevent deterioration in the blasting performance, and to operate the blasting apparatus by the small-sized air compressor 5. In contrast, the conventional blasting apparatus has to include the tank 11a and the water pump 11b for providing water to the nozzle 13, and is large-sized, resulting in that the conventional blasting apparatus cannot be set on the scaffold 16, and thus, the water hose 15 for feeding water to the nozzle 13 from the water supply unit 11 has to be lengthy, causing the blast hose 14 to be also lengthy.

EXAMPLE

There was carried out the blasting test through the use of the above-mentioned blasting apparatus in which the blasting material 1 in accordance with the current embodiment is used.

Figure 3A:
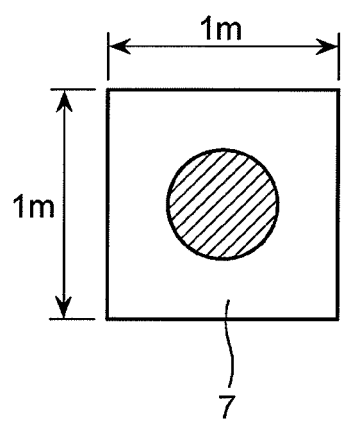
FIG. 3A is a front view of a plate used in the test.
Figure 3B:
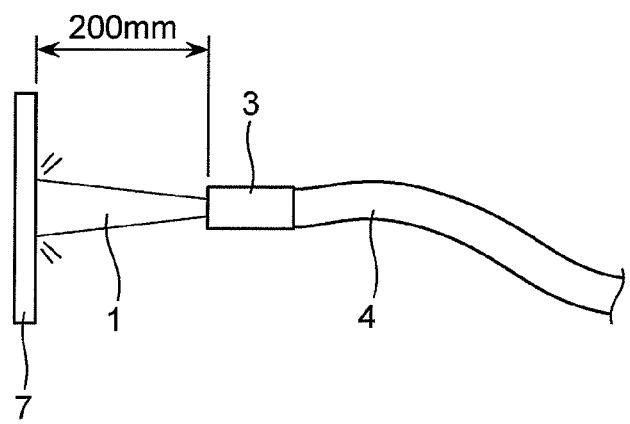
FIG. 3B is a side view of a plate, a nozzle and a hose in the test.

In the blasting test, a square steel plate 7 having four sides each of which is 1 meter was employed, as illustrated in FIG. 3A. The steel plate 7 is a black-scale steel plate (SS4400) having a thickness of 3.2 mm. As illustrated in FIG. 3B, the steel plate 7 was perpendicularly fixed on a support block (not illustrated). The nozzle 3 was directed to a center of the steel plate 7 such that a spray angle was 90 degrees and a distance between the steel plate 7 and a tip end of the nozzle 3 was 200 mm. Then, the blasting material 1 was sprayed onto the steel plate 7 out of the nozzle 3 through the hose 4.

In this situation in which the blasting material 1 was merely sprayed onto the steel plate 7, the blasting material 1 came into collision with a surface of the steel plate 7 to peel off an oxide film (black scale) adhered to a surface of the steel plate 7. In the same situation, dust would be generated in the conventional dry-type blasting process. Dust generated when the blasting materials 1 including water at various volumes were sprayed onto the steel plate 7, and how broadly water scattered on a surface of the steel plate 7 were observed for checking the performance of the blasting material 1.

The prepared blasting materials 1 contained the abrasives by 1 kg, and water by various volumes. Furthermore, the blasting materials 1 were designed to further contain both alkyl benzen sodium sulfonate as a surfactant and polyacrylic acid sodium as a water retention agent by a volume determined in dependence on a volume of water.

The blasting materials 1 including the abrasive by 1 kg and water by various volumes were sprayed onto the steel plate 7 for about 1 minute, and the conditions of a surface of the steel plate 7 were observed for the estimation. The standard for the estimation is shown in Table 1. The results of the test are shown in Tables 2 to 6.

TABLE 1

| | Conditions | | | |
| Status | Wet? | Amount of Dust | View | Judgment |
| --- | --- | --- | --- | --- |
| 1 | Not wet Only dry | Excessive | 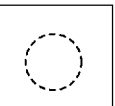 | Unsuitable |
| 2 | Wet Dry only at center Water not drop | Small | 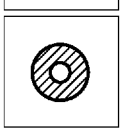 | Suitable |

TABLE 1-continued

| Status | Wet? | Amount of Dust | View | Judgment |
|---|---|---|---|---|
| 3 | Wet Water not drop | Small | 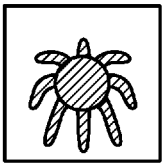 | Suitable |
| 4 | Wet Water slightly drops | Small | 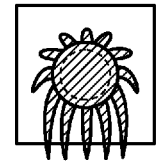 | Suitable |
| 5 | Wet Water much drops | Small | 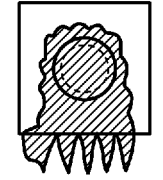 | Unsuitable |

TABLE 2

| Test Conditions | | | | Results | |
|---|---|---|---|---|---|
| Material of which the abrasives are composed | Diameter of the abrasives [mm] | Water Volume [mass %] | Remarks | Status | Judgment |
| Alumina | 0.15 to 0.1 | 1 | Adding Surfactant | 1 | Unsuitable |
| | | 3 | Adding Surfactant | 1 | Unsuitable |
| | | 5 | Adding Surfactant | 2 | Suitable |
| | | 10 | Adding Surfactant | 2 | Suitable |
| | | 15 | Adding Surfactant | 3 | Suitable |
| | | 20 | Adding Surfactant & Water retention agent | 3 | Suitable |
| | | 25 | Adding Surfactant & Water retention agent | 3 | Suitable |
| | | 30 | Adding Surfactant & Water retention agent | 4 | Suitable |
| | | 35 | Adding Surfactant & Water retention agent | 5 | Unsuitable |
| | | 40 | Adding Surfactant & Water retention agent | 5 | Unsuitable |

TABLE 3

| Test Conditions | | | | Results | |
|---|---|---|---|---|---|
| Material of which the abrasives are composed | Diameter of the abrasives [mm] | Water Volume [mass %] | Remarks | Status | Judgment |
| Alumina | 0.3 to 0.22 | 1 | Adding Surfactant | 1 | Unsuitable |
| | | 3 | Adding Surfactant | 1 | Unsuitable |
| | | 5 | Adding Surfactant | 2 | Suitable |
| | | 10 | Adding Surfactant | 2 | Suitable |
| | | 15 | Adding Surfactant | 3 | Suitable |
| | | 20 | Adding Surfactant & Water retention agent | 4 | Suitable |
| | | 25 | Adding Surfactant & Water retention agent | 4 | Suitable |
| | | 30 | Adding Surfactant & Water retention agent | 4 | Suitable |
| | | 35 | Adding Surfactant & Water retention agent | 5 | Unsuitable |
| | | 40 | Adding Surfactant & Water retention agent | 5 | Unsuitable |

TABLE 4

| Test Conditions | | | | Results | |
|---|---|---|---|---|---|
| Material of which the abrasives are composed | Diameter of the abrasives [mm] | Water Volume [mass %] | Remarks | Status | Judgment |
| Alumina | 0.85 to 0.6 | 1 | Adding Surfactant | 1 | Unsuitable |
| | | 3 | Adding Surfactant | 1 | Unsuitable |
| | | 5 | Adding Surfactant | 2 | Suitable |
| | | 10 | Adding Surfactant | 3 | Suitable |
| | | 15 | Adding Surfactant & Water retention agent | 3 | Suitable |
| | | 20 | Adding Surfactant & Water retention agent | 4 | Suitable |
| | | 25 | Adding Surfactant & Water retention agent | 4 | Suitable |

TABLE 4-continued

| Test Conditions | | | | Results | |
|---|---|---|---|---|---|
| Material of which the abrasives are composed | Diameter of the abrasives [mm] | Water Volume [mass %] | Remarks | Status | Judgment |
| | | 30 | Adding Surfactant & Water retention agent | 4 | Suitable |
| | | 35 | Adding Surfactant & Water retention agent | 5 | Unsuitable |
| | | 40 | Adding Surfactant & Water retention agent | 5 | Unsuitable |

TABLE 5

| Test Conditions | | | | Results | |
|---|---|---|---|---|---|
| Material of which the abrasives are composed | Diameter of the abrasives [mm] | Water Volume [mass %] | Remarks | Status | Judgment |
| Garnet | 0.6 to 0.25 | 1 | Adding Surfactant | 1 | Unsuitable |
| | | 3 | Adding Surfactant | 1 | Unsuitable |
| | | 5 | Adding Surfactant | 2 | Suitable |
| | | 10 | Adding Surfactant | 3 | Suitable |
| | | 15 | Adding Surfactant | 3 | Suitable |
| | | 20 | Adding Surfactant & Water retention agent | 3 | Suitable |
| | | 25 | Adding Surfactant & Water retention agent | 3 | Suitable |
| | | 30 | Adding Surfactant & Water retention agent | 4 | Suitable |
| | | 35 | Adding Surfactant & Water retention agent | 5 | Unsuitable |
| | | 40 | Adding Surfactant & Water retention agent | 5 | Unsuitable |

TABLE 6

| Test Conditions | | | | Results | |
|---|---|---|---|---|---|
| Material of which the abrasives are composed | Diameter of the abrasives [mm] | Water Volume [mass %] | Remarks | Status | Judgment |
| Slag (Neo-blast) | 0.8 to 0.3 | 1 | Adding Surfactant | 1 | Unsuitable |
| | | 3 | Adding Surfactant | 1 | Unsuitable |
| | | 5 | Adding Surfactant | 2 | Suitable |
| | | 10 | Adding Surfactant | 3 | Suitable |
| | | 15 | Adding Surfactant | 4 | Suitable |
| | | 20 | Adding Surfactant & Water retention agent | 4 | Suitable |
| | | 25 | Adding Surfactant & Water retention agent | 4 | Suitable |
| | | 30 | Adding Surfactant & Water retention agent | 4 | Suitable |
| | | 35 | Adding Surfactant & Water retention agent | 5 | Unsuitable |
| | | 40 | Adding Surfactant & Water retention agent | 5 | Unsuitable |

It is understood in view of the results that if the blasting material contained water below 5 mass %, much dust would generate because water was hardly able to prevent generation of dust. It is also understood that if the blasting material contained water beyond 30 mass %, it was able to reduce an amount of generated dust, but water separated from the abrasives and excessively dropped after a blasting was finished, resulting in that the additional treatment to waste water had to be carried out as well as the treatment to the abrasives.

In view of the above-mentioned observation, it is confirmed that the blasting material 1 including abrasives, and water in the range of 5 to 30 mass % both inclusive relative to a mass of the abrasives, the abrasives being prepared in advance such that all of the abrasives are uniformly wet, can prevent generation of dust, and makes it no longer necessary to additionally carry out the treatment to waste water.

In order to test the performance brought by a rust inhibitor, sprayed coatings were formed by a blasting process in which the blasting material 1 in accordance with the current embodiment is used, and further by a conventional dry-type blasting process. By measuring adhesive forces of those sprayed coatings, the performance of rust inhibitor was tested. As test pieces, there were used steel plates (SS400). A blasting process in which the blasting material 1 in accordance with the current embodiment was used was carried out to one of the test pieces, and then, a sprayed coating was formed on the test piece two days later. A conventional dry-type blasting process, in which the abrasives having the same diameter as those of the abrasives used in the blasting process in which the blasting material 1 was used were employed, was carried out to the other test piece, and then, a sprayed coating was formed on the test piece two hours later (within 4 hours in accordance with JIS H8300). An adhesive force of the sprayed coatings were measured in accordance with "A.2.2. Test for tensile adhesive strength (Process A)" defined in Appendix A of JIS H8300 (2005).

The conditions under which the test was carried out, and the results of the test are shown in Table 7.

TABLE 7

| | | Conditions | | | Results Adhesive force | |
|---|---|---|---|---|---|---|
| Blasting process | Abrasives | Diameter of Abrasives | Spraying apparatus | Sprayed material | Measured force | Average force |
| | | | | | [MPa] | |
| Blasting process in accordance with the current embodiment | Alumina & Rust inhibitor Water: 15 mass % | 0.1-0.85 [mm] | Plasma spraying apparatus | AL5%Mg [Coating thickness: 150 μm] | 7.6 7.4 8.2 8.3 7.9 | 7.93 |
| Conventional dry-type blasting process | Alumina | 0.1-0.85 [mm] | Plasma spraying apparatus | AL5%Mg [Coating thickness: 150 μm] | 8.2 7.4 7.8 8.1 7.9 | 7.93 |
| Blasting process in accordance with the current embodiment | Alumina & Rust inhibitor Water: 15 mass % | 0.1-0.85 [mm] | Gas-flame spraying apparatus | AL5%Mg [Coating thickness: 150 μm] | 5.62 6.24 5.58 6.35 7.01 | 6.16 |
| Conventional dry-type blasting process | Alumina | 0.1-0.85 [mm] | Gas-flame spraying apparatus | AL5%Mg [Coating thickness: 150 μm] | 6.33 5.87 5.96 6.53 5.76 | 6.09 |

Other conditions
Volume of rust inhibitor: 0.5 mass % relative to a mass of water
Volume of water held in the abrasives: 15 mass % relative to a mass of the abrasives (including the above-mentioned rust inhibitor)
The current embodiment: Sprayed coating was formed 2 days (48 hours) later than carrying out the blasting process
Conventional dry-type blasting process: Sprayed coating was formed 2 hours later than carrying out the blasting process
Conditions for driving the spraying apparatuses: Typical standard conditions
Material of Test pieces: Steel Plate (SS400)
Size of Test pieces: 6 mm (thickness) × 150 mm × 300 mm
Number of points at which adhesive force was measured: 5 points in a central area of the test pieces In view of the results shown in Table 7, it was understood that in the case that the blasting material 1 in accordance with the current embodiment was used for smoothing a surface of a target on which a sprayed coating was to be formed, regardless of the constraint that a step of spraying a material for forming a coating had to be carried out within 4 hours after a blasting process was carried out, a reduction in the adhesive force of sprayed coatings was not found, even if the step of spraying a material for forming a coating was carried out in two days after a blasting process was carried out.

INDUSTRIAL APPLICABILITY

The blasting material, the blasting process, and the bag all in accordance with the present invention are useful to a blasting to be carried out for preventing dust from generating and scattering during a target metal is being smoothed at a surface thereof by blasting, in the case that degraded paint is removed from a surface of the target metal, and a sprayed coating is to be formed on the surface for the purpose of preservation. In particular, whereas it costs so much to prevent generation of dust when degraded paint of a building in a town or a bridge above a river is to be repainted, the present invention makes it possible to remarkably reduce a volume of dust, ensuring reduction in cost for repainting a building or forming a sprayed coating on a building and so on.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2010-276143 filed on Dec. 10, 2010 including specification, claims, drawings and summary is incorporated herein by reference in its entirety.

What is claimed is:

1. A bag composed of a material capable of preventing water stored therein from evaporating,
    said bag containing a blasting material configured to collide with a surface of a target to thereby peel off adhesives adhered to said surface of said target, said blasting material including:
    abrasives; and
    water in the range of 5 to 30 mass % both inclusive based on a mass of said abrasives,
    said abrasives being prepared in advance such that all of said abrasives are uniformly wet.

2. The bag as set forth in claim 1, wherein said blasting material further includes a surfactant.

3. The bag as set forth in claim 2, wherein said blasting material includes said surfactant in the range of 0.1 to 5 mass % based on a mass of said water.

4. The bag as set forth in claim 2, wherein said blasting material includes said water and said surfactant in the range of 5 to 30 mass % both inclusive based on the mass of said abrasives.

5. The bag as set forth in claim 1, wherein said blasting material further includes a water retention agent.

6. The bag as set forth in claim 5, wherein said abrasives have a diameter in the range of 0.1 to 0.15 mm both inclusive, and said blasting material includes said water in the range of 15 to 30 mass % both inclusive based on the mass of said abrasives.

7. The bag as set forth in claim 5, wherein said abrasives have a diameter in the range of 0.6 to 0.85 mm both inclusive, and said blasting material includes said water in the range of 5 to 20 mass % both inclusive based on the mass of said abrasives.

8. The bag as set forth in claim 5, wherein said blasting material includes said water and said water retention agent in the range of 5 to 30 mass % both inclusive based on the mass of said abrasives.

9. The bag as set forth in claim 1, wherein said blasting material further includes a rust inhibitor.

10. The bag as set forth in claim 9, wherein said blasting material includes said water and said rust inhibitor in the range of 5 to 30 mass % both inclusive based on the mass of said abrasives.

11. The bag as set forth in claim 1, wherein said abrasives are composed of alumina.

12. The bag as set forth in claim 1, wherein said abrasives are composed of garnet.

13. The bag as set forth in claim 1, wherein said abrasives are composed of slag.

\* \* \* \* \*